(12) United States Patent
Mullet et al.

(10) Patent No.: US 12,103,278 B2
(45) Date of Patent: Oct. 1, 2024

(54) FIBERGLASS INSULATION BACKED SOUND MAT

(71) Applicant: UNITED STATES GYPSUM COMPANY, Chicago, IL (US)

(72) Inventors: Randy Mullet, Metairie, LA (US); Alex Macdonald, Gulf Shores, AL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 281 days.

(21) Appl. No.: 17/648,507

(22) Filed: Jan. 20, 2022

(65) Prior Publication Data

US 2022/0339915 A1 Oct. 27, 2022

Related U.S. Application Data

(60) Provisional application No. 63/180,436, filed on Apr. 27, 2021.

(51) Int. Cl.
*B32B 27/12* (2006.01)
*B32B 3/26* (2006.01)
(Continued)

(52) U.S. Cl.
CPC ............ *B32B 27/12* (2013.01); *B32B 3/26* (2013.01); *B32B 5/028* (2013.01); *B32B 13/12* (2013.01); *B32B 13/14* (2013.01); *B32B 21/10* (2013.01); *B32B 21/14* (2013.01); *B32B 27/30* (2013.01); *B32B 27/32* (2013.01); *B32B 27/34* (2013.01); *E04F 15/203* (2013.01); *E04F 15/206* (2013.01); *B32B 2262/0276* (2013.01); *B32B 2262/101* (2013.01); *B32B 2307/102* (2013.01);
(Continued)

(58) Field of Classification Search
CPC .......... B32B 27/12; B32B 3/26; B32B 5/028; B32B 13/12; B32B 13/14; B32B 21/10; B32B 21/14; B32B 27/30; B32B 27/32; B32B 27/34; B32B 2262/0276; B32B 2262/101; B32B 2307/102; B32B 2307/558; B32B 2307/72; B32B 2307/732; B32B 2419/00; E04F 15/203; E04F 15/206; E04F 15/105; F24D 3/14
See application file for complete search history.

(56) References Cited

U.S. PATENT DOCUMENTS 6,087,279 A 7/2000 Laun
7,319,078 B2 1/2008 Yamaguchi et al.
(Continued)

OTHER PUBLICATIONS

International Search Report and Written Opinion received for PCT/US2022/071867, mailed Aug. 12, 2022.
(Continued)

*Primary Examiner* — Gisele D Ford
(74) *Attorney, Agent, or Firm* — Greer, Burns & Crain, Ltd; Philip T. Petti; Pradip Sahu

(57) ABSTRACT

An acoustic isolation mat is provided for placement between a subfloor and a finished floor. The acoustic isolation mat has a first layer placed directly upon the subfloor that includes a fiberglass-containing acoustic insulation, a second layer placed directly upon the first layer that includes an entangled polymer, and a third layer placed directly upon the second layer and below the finished floor that has a sheet of fibrous material.

10 Claims, 1 Drawing Sheet

(51) Int. Cl.

| | | |
|---|---|---|
| *B32B 5/02* | (2006.01) | |
| *B32B 13/12* | (2006.01) | |
| *B32B 13/14* | (2006.01) | |
| *B32B 21/10* | (2006.01) | |
| *B32B 21/14* | (2006.01) | |
| *B32B 27/30* | (2006.01) | |
| *B32B 27/32* | (2006.01) | |
| *B32B 27/34* | (2006.01) | |
| *E04F 15/10* | (2006.01) | |
| *E04F 15/20* | (2006.01) | |
| *F24D 3/14* | (2006.01) | |

(52) U.S. Cl.
CPC ..... *B32B 2307/558* (2013.01); *B32B 2307/72* (2013.01); *B32B 2307/732* (2013.01); *B32B 2419/00* (2013.01); *E04F 15/105* (2013.01); *F24D 3/14* (2013.01)

(56) References Cited

U.S. PATENT DOCUMENTS

| | | |
|---|---|---|
| 7,886,488 B2 | 2/2011 | Payne, Jr. et al. |
| 8,127,510 B2 | 3/2012 | Wagner |
| 8,146,310 B2 | 4/2012 | Keene |
| 8,171,687 B2 | 5/2012 | Dellinger et al. |
| 8,544,218 B2 | 10/2013 | Dellinger et al. |
| 9,422,714 B2 | 8/2016 | Miller |
| 10,260,241 B2 | 4/2019 | Kaligian, II et al. |
| 10,370,860 B2 | 8/2019 | Socha |
| 2004/0088938 A1 | 5/2004 | Andersson et al. |
| 2009/0242325 A1 | 10/2009 | Dellinger et al. |
| 2014/0062126 A1* | 3/2014 | Weinberg ................ B32B 33/00 156/289 |
| 2016/0185077 A1* | 6/2016 | Andrews ................ B32B 37/10 156/60 |
| 2016/0319553 A1* | 11/2016 | Lautzenhiser .......... B32B 27/12 |
| 2019/0277028 A1* | 9/2019 | Chevillard ................ B32B 3/26 |
| 2020/0138221 A1* | 5/2020 | Himstedt ............. D06N 7/0071 |
| 2020/0263429 A1* | 8/2020 | Powell ................ D06N 5/003 |
| 2020/0338867 A1* | 10/2020 | Luttwak ................ B32B 21/02 |

OTHER PUBLICATIONS

Enka Solutions, "EnkaSonic 400 A Acoustic Subfloor Solutions" Technical Data Sheet, www.enkasolutions.com, Accessed Apr. 22, 2021, 2 pages.

* cited by examiner

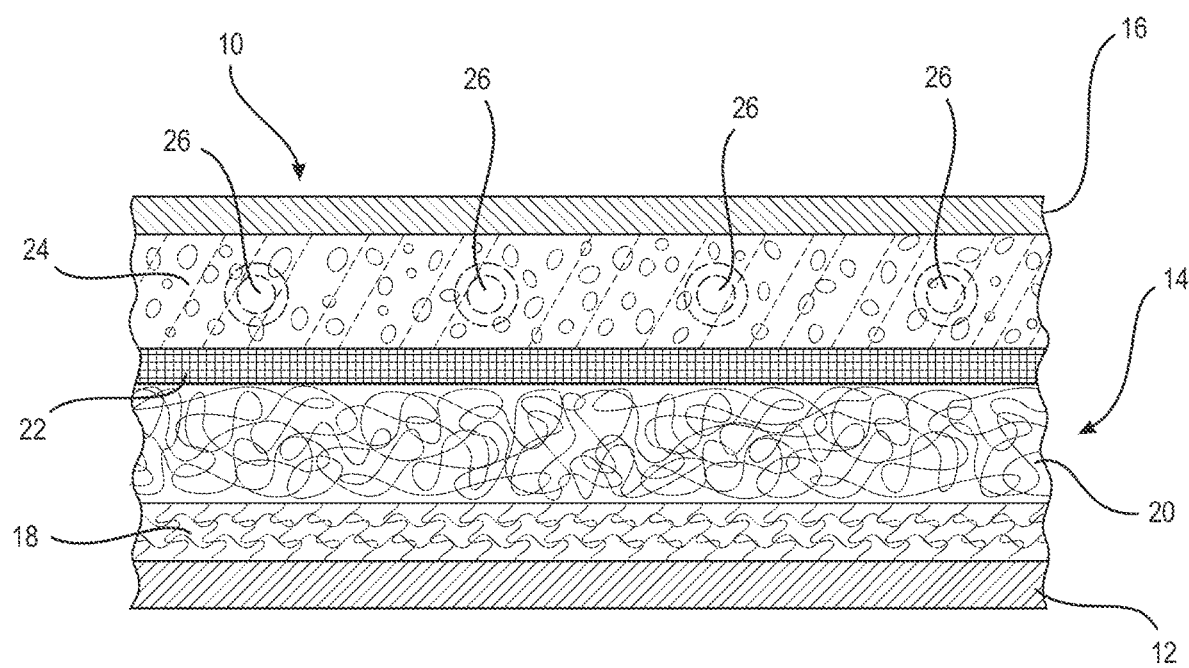

FIBERGLASS INSULATION BACKED SOUND MAT

RELATED APPLICATION

This application is a Non-Provisional of, and claims 35 USC 119 priority from U.S. provisional application Ser. No. 63/180,436 filed Apr. 27, 2021, the contents of which are incorporated by reference herein.

BACKGROUND

The present invention relates to sound reduction mats designed to reduce airborne and impact sound transmission, and more specifically relates to an improved fiberglass insulation backed sound reduction mat which improves acoustical isolation while having a relatively space-conserving profile to enhance compliance with existing building design parameters.

Conventional flooring systems which utilize sound reduction mats include a subfloor of poured concrete or plywood. Buildings are increasingly using flooring systems with subfloors made of cross laminated timber (CLT). CLT provides benefits such as enhanced mechanical strength, sustainability and cost effectiveness compared to conventional subflooring materials. Additionally, various underlayments located between the subfloor and the finished floor (typically ceramic tile, vinyl tile or hardwood) have been used to reduce sound transmission.

Sound reduction mats are known for acoustically isolating a room beneath a floor on which impacts may occur, such as pedestrian footfalls, sports activities, dropping of toys, or scraping caused by moving furniture. Impact noise generation can generally be reduced by using thick carpeting, but where concrete finishes, ceramic tile, vinyl flooring, or hardwood finishes are used, a sound reduction mat may be particularly desirable. This is especially the case where the subfloor is made of CLT.

Sound rated floors are typically evaluated by ASTM Standard E492 and are rated as to impact insulation class (IIC). The greater the IIC rating, the less impact noise will be transmitted to the area below. Floors may also be rated as to Sound Transmission Class (STC) per ASTM E90. The greater the STC rating, the less airborne sound will be transmitted to the area below. Sound rated floors typically are specified to have an IIC rating of not less than 50 and an STC rating of not less than 50. Many building codes require an IIC rating of 50 or higher, which is difficult to attain for buildings which utilize CLT for the subfloor. Moreover, even though an IIC rating of 50 meets many building codes, experience has shown that in luxury condominium applications even floor-ceiling systems having an IIC of 56-57 may not be acceptable because some impact noise is still audible.

In addition to having an adequate STC and IIC rating, an acceptable sound rated floor should also have a relatively low profile. Low profile is important to maintain minimum transition height between a finished sound rated floor and adjacent areas, such as carpeted floors, which ordinarily do not need the sound rated construction. Low profile is also important for maintaining door threshold and ceiling height dimensions, restraining construction costs, and maintaining other architectural parameters.

Also, a sound rated floor should exhibit sufficient vertical stiffness to reduce cracking, creaking, and deflection of the finished covering. At the same time, the sound rated floor should be resilient enough to isolate the impact noise from the area to be protected below. Thus, designers of acoustic flooring are challenged to strike a balance between vibration dampening and structural integrity of the floor.

Two isolation media currently used and also approved by the Ceramic Tile Institute for sound rated tile floors are (i) 0.40 inch (1.016 cm) ENKASONIC® brand matting (nylon and carbon black spinerette extruded 630 g/sq. meter) manufactured by Colbond Inc. of Enka, North Carolina and (ii) 0.25 inch (0.635 cm) Dow ETHAFOAM™ (polyethylene foam 2.7 pcf, 43.25 kg/m$^3$) manufactured by Dow Chemical Co., Midland Michigan. While both of these systems are statically relatively soft and provide some degree of resiliency for impact insulation, the added effect of air stiffness in the 0.25 and 0.40 inch thick media makes the system very stiff dynamically and limits the amount of impact insulation. Because the systems are statically soft, they do not provide a high degree of support for the finished floor, and a relatively thick (7/16 inch, 1.111 cm) glass mesh mortar board, such as a product called Wonderboard, is used on top of the media to provide rigidity for preventing grout, tiles, and other finished flooring from cracking. Alternatively, a relatively thick (1¼ inch, 3.175 cm) reinforced mortar bed is often installed on top of the resilient mat.

Other known acoustic flooring materials include a poured settable underlayment sold under the mark LEVELROCK® by United States Gypsum Company of Chicago, Illinois (USG). LEVELROCK® underlayment is a mixture of Plaster of Paris, Portland Cement and Crystalline Silica. LEVELROCK® underlayments have been used with sound reduction mats located between the underlayment and the subfloor. Such mats are made of polymeric material and typically feature a matrix of hollow cylindrical shapes held together by a thin mesh. Another material used to dampen sound transmission is Sound Reduction Board (SRB) sold by USG of Chicago, Illinois, also under the mark LEVELROCK®. SRB is a mixture of man-made vitreous fiber and minerals, including slag wool fiber, expanded Perlite, starch, cellulose, Kaolin and crystalline silica.

Another known isolation system includes the installation of pads or mounts placed on a subfloor, wooden sleepers are then laid over the isolation pads or mounts, and a plywood deck is fastened to the sleepers to form a secondary subfloor. Often, glass fiber insulation is placed in the cavity defined between the sleepers. A poured or sheet-type underlayment material is then applied to the secondary subfloor. While acoustically effective in reducing sound transmissions, this system adds as much as 6 inches (15.24 cm) to the thickness of a floor. This thickness is undesirable in most commercial and multi-family residential buildings.

Additionally, sound reduction mats are known for use in flooring systems to improve the acoustic effective in reducing sound transmissions. A suitable mat is disclosed in U.S. Pat. No. 10,370,860 which is incorporated by reference. These mats are typically sandwiched between the subfloor and a poured floor underlayment, and typically involve a matrix of various petrochemical materials, such as nylon, polypropylene, or polyethylene with some type of backing. The function of the backing is to provide a platform upon which the underlayment is poured.

However, existing sound reduction mats do not provide sufficient sound reduction, especially when used with CLT subfloors. Typically, multiple mats are used to achieve the necessary acoustic isolation, thereby increasing the thickness of the floor. Additionally, the acoustic flooring systems which utilize a single sound reduction mat have been unable to consistently achieve IIC values greater than 50 and in the desired range of 55-60. This is especially true for buildings with subfloors made of CLT. Moreover, other systems designed for providing acoustic isolation have significant drawbacks. Accordingly, there is a need for an improved sound reduction mat which addresses the above-identified design parameters.

SUMMARY

The above-listed need is met or exceeded by the present fiberglass insulation backed sound mat and associated composite flooring system, which provide superior sound isolation, thermal performance, durability to withstand trade traffic, the ability to repel moisture, and flame attenuation. Specifically, the present sound mat utilizes a three-layer assembly, where the first layer includes a fiberglass-containing acoustic insulation and the second layer includes an entangled polymer. Entangled polymers provide heightened acoustic isolation, especially when coupled with a fiberglass containing acoustic insulation. Specifically, the entangled polymer includes air voids built within the material. These air voids are particularly useful in providing acoustic isolation. Finally, a fibrous material is disposed upon the entangled polymer and sufficiently separates the underlayment from the first two layers. Moreover, the fibrous material is designed so that the air voids created within the entangled polymer are not impaired, while also repelling moisture. Since each of the three layers is different, they all have discontinuous acoustic properties, which reduces the amount of sound energy transmitted between the layers, and ultimately, through the floor. A feature of the present mat is that the combination of these materials results in the unexpected superior acoustic isolation, especially when used with a CLT subfloor.

More specifically, an acoustic isolation mat is provided for placement between a subfloor and a finished floor. Included in the present acoustic isolation mat is a first layer placed directly upon the subfloor that includes a fiberglass-containing acoustic insulation. A second layer is placed directly upon the first layer and includes an entangled polymer, and a third layer, which is placed directly upon the second layer and below the finished floor, has a sheet of fibrous material. It is preferred that the first layer provides acoustic and thermal insulation. In a preferred embodiment, the entangled polymer is either a durable nylon polymer or polypropylene. Preferably, the second layer is heat bonded to the third layer, and preferably still the combination of the second layer and the third layer is heat bonded to the first layer. In alternate embodiments, the first layer includes rubber, is approximately ¼ inch (0.635 cm) high, and has a density of 1 pcf (16.02 kg/m³). In yet further embodiments, the finished floor is luxury vinyl plank, the three layers combined have a height of less than or equal to 2 inches (5.08 cm), and the subfloor is made of a cross laminated timber (CLT). Preferably, the sheet of fibrous material is either a point bonded polyester or a needle punched fabric.

A second embodiment of the present disclosure is a composite flooring system which is configured for reduced acoustic transmission. The composite flooring system has a cross laminated timber (CLT) subfloor, a first layer placed directly upon the CLT subfloor that includes a fiberglass-containing acoustic insulation, a second layer placed directly upon the first layer that includes an entangled polymer and, a third layer placed directly upon the second layer that includes a sheet of fibrous material, a poured underlayment deposited upon the third layer, and a finished floor disposed above the poured underlayment. The composite flooring system, which includes the CLT subfloor and the finished floor, has an impact insulation class above 50. In preferred embodiments, a series of radiant heat tubes are placed within the poured underlayment, and the entangled polymer is either a durable nylon polymer or polypropylene. Preferably, the second layer is heat bonded to the third layer, and preferably still the combination of the second layer and the third layer is heat bonded to the first layer. In alternate embodiments, the first, second and third layers combined have a height of less than or equal to 2 inches (5.08 cm), and the finished floor is luxury vinyl plank. In further alternate embodiments, and the first layer further includes rubber, is approximately ¼ (0.635) inch high, and has a density of 1 pcf (16.02 kg/m³). Preferably, the sheet of fibrous material is either a point bonded polyester or a needle punched fabric.

BRIEF DESCRIPTION OF THE DRAWING

FIG. 1 is a schematic vertical cross-section of the present composite flooring system.

DETAILED DESCRIPTION

Referring now to FIG. 1, in which the layers are shown schematically and not to scale, the present composite flooring system is generally designated 10, and is used in a construction having a subfloor 12, shown schematically. Conventionally, subfloors have been made with materials such as poured concrete or at least one layer of plywood as is known in the art. However, more recently, cross laminated timber (CLT) has emerged as a popular material for use in subfloors. Specifically, CLT provides desirable mechanical properties, while being more cost effective than other conventional subfloor materials. As is known in the art, the subfloor 12 is supported by joists (not shown) typically made of wood, steel, or concrete.

The present composite flooring system 10 includes an acoustic isolation mat, generally designated 14, which is disposed between the subfloor 12 and a finished floor 16, which is typically ceramic tile, vinyl tile, hardwood, luxury vinyl plank or other hard materials other than carpeting. Note that the acoustical properties of a carpet and pad installation are such that they typically eliminate the need for a sound mat system. However, some of the thin carpet tiles being used in today's office buildings have poor acoustical values and a sound system with underlayment and sound mat may be needed for that floor covering as well to achieve desired sound attenuation values. In the preferred composite flooring system 10, the finished floor 16 is a luxury vinyl plank, and the subfloor 12 is made of CLT.

A first layer 18 of the acoustic isolation mat 14, which is disposed directly upon the subfloor 12, includes a fiberglass containing acoustic insulation. Also preferably providing thermal insulation, the first layer 18 may also include rubber or other suitable polymeric material as is known in the art. Two functions are served by the first layer 18: it provides a flame attenuation barrier, and it provides one level of discontinuity of material, which is an important factor in reducing sound transmissions through the composite flooring system 10. A preferred fiberglass containing acoustic insulation is sold by Johns Manville under Microlite® Fiberglass Equipment Insulation having flame attenuated glass fibers bonded with a thermosetting resin. Additionally, the preferred fiberglass containing acoustic insulation includes air voids within the insulation, as the air voids further aid in sound isolation. Preferably, the first layer 18 has a thickness or height of approximately ¼ inches (0.635 cm) and a density of approximately 1 pound per cubic foot (pcf) (16.02 kg/m³). Alternative thicknesses and densities are contemplated.

U.S. Pat. No. 8,127,510, which is incorporated by reference, discloses a fiberglass thermal and acoustic insulation material that includes fiberglass macrospheres and glass microspheres within the insulation. The preferably hollow glass microspheres provide additional acoustic isolation, while the fiberglass macrospheres resolve some of the deficiencies of glass microspheres. Overall, an optional fiberglass-containing insulation includes randomly distributed inorganic fibers which are supplemented with microspheres, macrospheres, or both, and preferably includes hollow microspheres, which boost the insulation value of the fiberglass thermal insulation. While this is a preferred fiberglass insulation, it is understood that any number of fiberglass acoustic insulations are available for use in the first layer 18, as is known in the art.

A second layer 20 of the acoustic isolation mat 14 is disposed directly upon the first layer 18 and includes an entangled polymer. It is contemplated that the entangled polymer is either a durable nylon polymer, polypropylene, or another suitable polymer as is known in the art. A preferred second layer 18 is sold by USG under LEVELROCK® Brand SAM-N25™, SAM-N40™, and SAM-N75™ Sound Attenuation Mats. Other products which include an entangled polymer are contemplated for use in the second layer 20.

The second layer 20 is also referred to as a decoupling layer due to its acoustical properties of creating an acoustically isolated space. A preferred thickness or height of the second layer 20 is in the range of ⅛-1 inch (0.635-2.54 cm). Also, the second layer 20 is provided in sufficient density to provide that, despite the weight applied to the composite flooring system 10, it retains a layer of air which also contributes as a sound isolating barrier. It will be appreciated that the thickness of the second layer 20 may vary to suit the situation and the desired acoustical performance of the composite flooring system 10.

Moreover, a third layer 22 is disposed upon, and optionally attached to, the second layer 20 by heat fusion, adhesives, co-extrusion or similar manufacturing technology. Preferably, the second layer 20 and the third layer 22 are heat bonded or heat welded to one another. More specifically, the second layer 20 is optionally an extruded sheet, that is heated to, for example, around 400 to 450° F. While the second layer 20 is still warm and fresh from the extruder, the third layer 22 is placed upon the second layer 20, thereby heat bonding the third layer to the second layer. Moreover, in the preferred embodiment, once the second layer 20 and the third layer 22 have been heat bonded to one another, the combination is heat bonded to the first layer 18. In particular, the bottom of the second layer 20 is reheated, and the combination of the second layer 20, and the third layer 22 is heat bonded to the first layer 18. In this preferred embodiment, the sound attenuation mat 14 is a single piece, where the three layers 18, 20, 22 are all heat bonded to one another.

The third layer 22 includes a sheet of fibrous material, and preferably is made of point bonded polyester. Alternatively, the sheet of fibrous material is a needle punched fabric, or other material as is known in the art. Taken together, the three layers 18, 20, 22 provide discontinuity of material and dampening properties, which is a significant factor in reducing sound transmission through the composite flooring system 10. Also, it is contemplated that the acoustic isolation mat 14 has a height or thickness of less than or equal to 2 inches (5.08 cm).

Placed upon the third layer 22 is a poured underlayment 24, which is disposed below the finished floor 16. In the preferred embodiment, the poured underlayment 24 is USG LEVELROCK® floor underlayment cement being provided in various formulations having a composition including main ingredients of Plaster of Paris Portland Cement and other additives. Other pourable underlayments are contemplated. An adhesive layer (not shown) such as mortar, mastic or chemical adhesive may secure the finished floor 16 to the underlayment 24. In the case of wood floors and some vinyl floors, these might be floating over the underlayment or secured with adhesive, depending on a variety of architectural and/or local building code factors and manufacturer recommendations.

In certain building configurations, it is advisable to have heating tubes disposed within the composite flooring system 10. Therefore, the present composite flooring system 10 optionally includes a series of radiant heat tubes 26 (shown hidden) which are placed within the poured underlayment 24. The heating tubes 26 are placed at the desired location within the poured underlayment 24, so that when the poured underlayment 24 dries or sets, the heating tubes 26 will be fixed in place.

Experiments conducted upon the present composite flooring system 10 exhibited unexpectedly superior sound isolation, especially when used with a CLT subfloor 12. Specifically, the present composite flooring system 10 was found to have an impact insulation class (IIC) routinely above 50, including configurations where the subfloor 12 was CLT. This was an unexpected result as conventional flooring systems typically are unable to achieve this high of an IIC system when only using a single sound isolation mat. Even more surprising is the fact that the present composite flooring system 10 was able to achieve this sound isolation while utilizing a single acoustic isolation mat 14 combined with a CLT subfloor 12.

In an installation, the acoustic isolation mat 14 is first placed upon the subfloor 12, so that the first layer 18 is in contact with the subfloor 12. Next, the poured underlayment 24 is installed. As discussed above, the preferred poured underlayment 24 is USG LEVELROCK® floor underlayment cement. The poured underlayment 24 is combined at the jobsite with water and sand at various ratios (depending upon the desired strength) and pumped onto the subfloor at various thicknesses. In general, sound mats compromise the durability of the floor, and to offset this require a higher thickness of underlayment to be applied over them. However, due to the relatively thin thickness of the present acoustic isolation mat 14, the potential exists for higher thicknesses of underlayment to be used while still maintaining the necessary floor thickness. Optionally, the heat tubes 26 are placed within the poured underlayment 24, such that the heat tubes 26 become fixed within the poured underlayment 24 when it dries. Upon setting of the underlayment 24, the finished floor 16 is applied as is well known in the art.

While a particular embodiment of the present fiberglass insulation backed sound mat has been described herein, it will be appreciated by those skilled in the art that changes and modifications may be made thereto without departing from the invention in its broader aspects and as set forth in the following claims.

The invention claimed is:

1. A composite flooring system configured for reduced acoustic transmission, the flooring system comprising:
   a cross laminated timber (CLT) subfloor;
   a first layer placed directly upon said CLT subfloor and comprising a fiberglass-containing acoustic insulation;

a second layer placed directly upon said first layer and comprising an entangled polymer;

a third layer placed directly upon said second layer and comprising a sheet of fibrous material;

a poured underlayment deposited upon said third layer; and a finished floor, thereby forming a composite flooring with said subfloor and said finished floor, said composite floor having an Impact Insulation Class above 50.

2. The composite flooring system of claim 1, wherein a series of radiant heat tubes are placed within said poured underlayment.

3. The composite flooring system of claim 1, wherein said entangled polymer is either a durable nylon polymer or polypropylene.

4. The composite flooring system of claim 1, wherein said second layer is heat bonded to said third layer.

5. The composite flooring system of claim 4, wherein said second layer and said third layer are heat bonded to said first layer.

6. The composite flooring system of claim 1, wherein said sheet of fibrous material is either a point bonded polyester or a needle punched fabric.

7. The composite flooring system of claim 1, wherein said first, second and third layers combined have a height of less than or equal to 2 inches (5.08 cm).

8. The composite flooring system of claim 1, wherein said first layer is approximately ¼ inch (0.635 cm) high and has a density of 1 pcf (16.02 kg/m$^3$).

9. The composite flooring system of claim 1, wherein said finished floor is luxury vinyl plank.

10. The composite flooring system of claim 1, wherein said first layer further comprises rubber.

* * * * *